April 22, 1958
J. M. BISING
2,831,492
RUPTURE DISC SAFETY VALVE
Filed Dec. 6, 1955
2 Sheets-Sheet 1
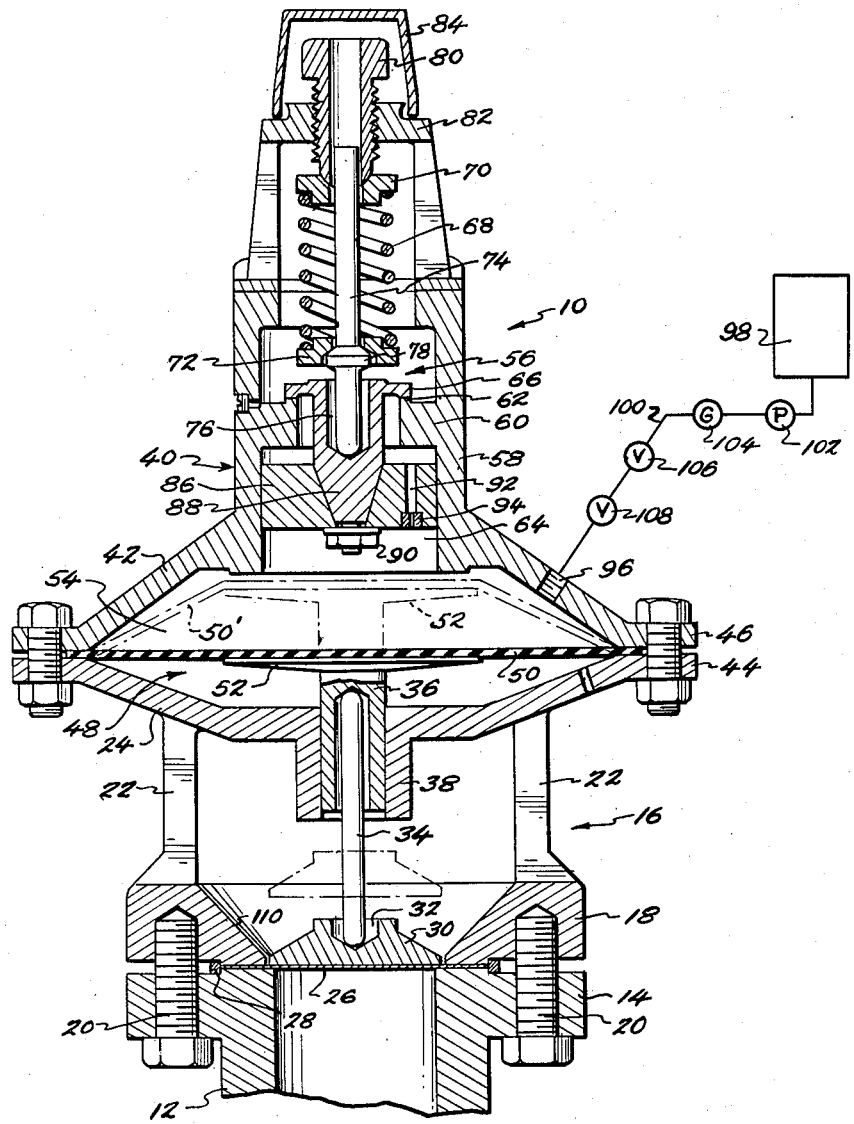
Fig. ~1~
INVENTOR.
JAMES M. BISING
BY
ATTORNEY April 22, 1958 J. M. BISING 2,831,492
RUPTURE DISC SAFETY VALVE
Filed Dec. 6, 1955 2 Sheets-Sheet 2
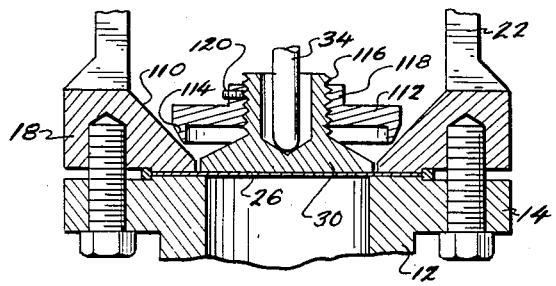
Fig. ~2~
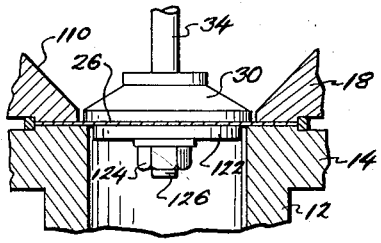
Fig. ~3~
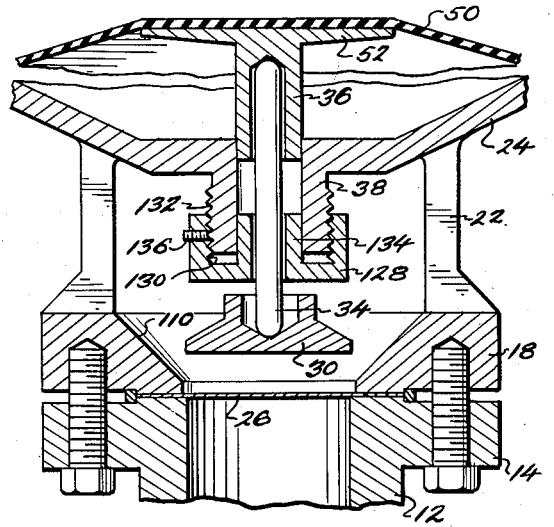
Fig. ~4~
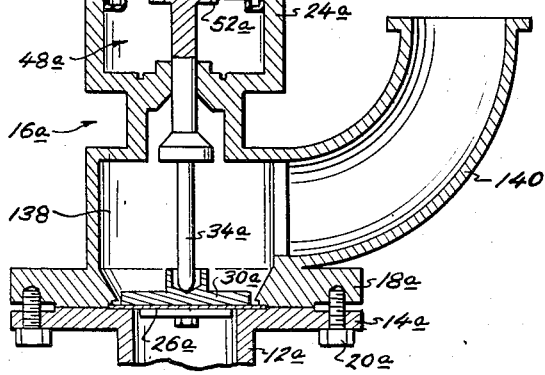
Fig. ~5~
INVENTOR.
JAMES M. BISING
BY
ATTORNEY

United States Patent Office 2,831,492
Patented Apr. 22, 1958

2,831,492

RUPTURE DISC SAFETY VALVE

James M. Bising, Leonia, N. J., assignor to Henze Instrument and Valve Inc., Hoboken, N. J., a corporation of New Jersey Application December 6, 1955, Serial No. 551,300

17 Claims. (Cl. 137—69)

The present invention relates generally to safety or pressure relief valves, and is particularly directed to rupture disc safety valves of the type embodying a rupturable disc closing a pressure release outlet from the vessel or pipe to be protected and subjected to the pressure in the latter so that, in the event that such pressure becomes excessive, the disc is thereby ruptured and permits escape of the contained fluid.

The usual pressure relief valves, wherein a valve member or feather disc is held upon a seat by an adjustable spring force and is unseated by the pressure of the fluid acting thereagainst to maintain the pressure within the protected vessel or pipe below a value determined by the adjustable spring force, are not suited for many applications, for example, in cases where the pressurized fluid is corrosive and would attack the parts of the relief valve to destroy the reliable operativeness of the valve.

In order to provide protection against the development of excessive pressures in vessels or pipes containing corrosive or other fluids preventing the use of the usual pressure relief valves, safety devices embodying rupturable discs have been proposed, wherein the rupturable disc, prior to the occurrence of an excessive pressure, prevents any contact between the pressurized fluid and the other parts of the safety device. These existing rupturable disc devices are generally classifiable in two categories: those where the disc itself is subjected to and resists the pressure of the contained fluid so that release occurs upon rupturing of the disc by an excessive pressure, such devices being referred to as "loaded disc" safety devices; and those where the pressure of the fluid against the disc is transmitted to a remote frangible pin normally supporting the disc against the fluid pressure so that release occurs when the excessive pressure causes a break in the frangible pin, and the disc, deprived of its support, is ruptured by the fluid pressure, devices in this last mentioned category being referred to as "frangible pin" safety devices. In both the loaded disc and frangible pin types of rupture disc safety devices, the release of pressure depends upon the rupture or breaking of a structural member in response to the occurrence of an excessive pressure, and such devices have inherent disadvantages among which are the fact that the loaded rupture disc or frangible pin supporting the rupture disc must be designed to fail at a particular bursting pressure and, once produced to fail at that pressure, there is no possibility of adjusting or varying the pressure at which release will occur. Further, since the loaded disc or the frangible pin must be formed of a material having a high yield point to ultimate strength ratio, only a limited number of materials are available for that purpose, for example, silver, platinum or nickel, and such materials that may be used are either expensive or in short supply, particularly in wartime. An additional important disadvantage of the existing rupture disc safety devices resides in the poor reproducible bursting qualities thereof and the fact that costly processing of the material making up the loaded disc or frangible pin is required to achieve the desired rupture characteristics. The poor reproducible bursting qualities of the existing devices make it necessary to increase the strength of the associated pressure vessel or pipes beyond that which would be required if the safety device could be dependent upon to relieve the pressure at exactly the desired value.

Accordingly, it is a general object of the present invention to provide rupture disc safety valves that avoid all of the foregoing disadvantages of the existing rupture disc safety devices.

More specifically, an object of the present invention is to provide rupture disc safety valves having accurately reproducible bursting characteristics so that release of the pressure in the protected vessel or pipe will always occur at the desired pressure, thereby permitting the designing of the protected vessel or pipe with lower safety factors than have been required in connection with the use of existing rupture disc safety devices.

Another object is to provide rupture disc safety valves wherein the bursting pressure can be adjusted over a relatively wide range so that the necessity of producing a different safety valve for each application is thereby avoided.

Another object is to provide rupture disc safety valves wherein the limitations on the materials from which the rupture discs may be produced are substantially eliminated, and the necessity for expensive and precise processing of the discs is avoided.

In accordance with an aspect of the invention, a rupture disc safety valve embodies a rupturable disc closing a pressure release outlet from the vessel or pipe to be protected, a hydraulic system supporting the rupturable disc at normal working pressures, and a safety relief valve associated with the hydraulic system and set to relieve at the desired bursting pressure so that, when the pressure within the protected vessel or pipe reaches the predetermined bursting pressure, the safety relief valve unseats to collapse the hydraulic system, and the rupture disc, deprived of support by the hydraulic system, is immediately ruptured.

It will be apparent that, in the above embodiment of the invention, the setting of the safety relief valve rather than the ultimate strength or bursting pressure of the rupture disc determines the pressure at which release is effected. Thus, the rupture disc can be designed so that, in the absence of support therefor from the associated hydraulic system, failure will occur at a pressure, referred to as the unsupported bursting pressure, which is substantially less than the bursting pressure, that is, the pressure within the protected vessel or pipe at which release is to be effected, for example, the unsupported bursting pressure of the rupture disc may be only 50 percent of the desired bursting pressure. With such an arrangement, the tolerances on the unsupported bursting pressure of the rupture disc need not be very close, as variations in the actual unsupported bursting pressure of the disc will not affect the rupturing of the latter at the much greater bursting pressure as soon as the support of the hydraulic system is removed from the rupture disc by unseating of the associated safety relief valve.

Further, in accordance with the invention, the safety relief valve controlling the collapse of the hydraulic support system is of special design to provide a very large "blow down," which is the "pop point," that is, the pressure at which the feather disc lifts off its seat to relieve the pressure in the hydraulic system, minus the reseating point, usually given as a percentage of the pop point. In most conventional safety relief valves, the blow down is from 1% to 10%, while the safety relief valves of rupture disc safety valves embodying the present invention have a blow down of 70% or more, thereby to ensure the rapid collapse of the hydraulic support system when the predetermined bursting pressure is reached in the vessel or pipe to be protected.

The above, and other objects, features and advantages of the invention, will be apparent in the following detailed description of illustrative embodiments thereof which is to be read in connection with the accompanying drawings forming a part hereof, and wherein:

Fig. 1 is an axial sectional view of a rupture disc safety valve embodying the present invention;

Fig. 2 is a fragmentary sectional view of a portion of the valve in Fig. 1, but with an additional element provided on the support follower to utilize the kinetic and static energy of the lading discharge for the purpose of obtaining full lift of the support follower after bursting of the rupture disc;

Fig. 3 is a view similar to Fig. 2, but showing an arrangement for providing vacuum protection for the rupture disc when the latter is thin or formed of an elastomeric material;

Fig. 4 is a fragmentary sectional view of a portion of the valve in Fig. 1, but showing a follower stop embodied therein to limit the support load that can be transmitted to the rupture disc; and Fig. 5 is an axial sectional view of a rupture disc safety valve constructed in accordance with another embodiment of this invention.

Referring to the drawings in detail, and initially to Fig. 1 thereof, a rupture disc safety valve embodying the present invention is there illustrated and generally identified by the reference numeral 10. The rupture disc safety valve 10 is shown mounted on a pressure release outlet 12 extending from the vessel or pipe system (not shown) to be protected and having a radial mounting flange 14 at its outer end.

The rupture disc safety valve 10 includes a lower body member 16 made up of an annular mounting member 18 secured to the mounting flange 14, for example, by bolts or machine screws 20 extending through holes in the flange 14 into tapped, registering holes in the mounting member 18, posts or columns 22 integral with the mounting member and extending from the latter to a lower diaphragm chamber section 24 which flares upwardly.

A rupture disc 26 is clamped, at its periphery, between the confronting faces of the mounting flange 14 and mounting member 18 and is suitably centered, for example, by a centering ring 28 disposed between undercut portions of the confronting faces, so that the outlet 12 is normally sealed by the rupture disc 26. The rupture disc may be formed of any suitable material, including elastomeric or rubber-like materials, and the basic consideration in its design is that the pressure capable of effecting bursting of the disc 26 when the latter is unsupported at the face of the disc away from the pressure, that is, the unsupported bursting pressure, should be no more than one-half the required bursting pressure or pressure within the protected vessel or pipe system at which release is to be effected. Thus, if release is to be effected at a pressure of 100 p. s. i., the rupture disc 26 should have an unsupported bursting pressure of no more than 50 p. s. i.

It is apparent that the pressure existing within the vessel or pipe system being protected is communicated to the underside of the rupture disc 26, and that, if the disc 26 is unsupported at its upper side, the occurrence of the predetermined bursting or release pressure within the protected vessel or pipe system, which pressure is at least twice the unsupported bursting pressure of the rupture disc, will cause immediate bursting of the disc 26 to permit discharge of the pressurized fluid through the annular member 18 and between the posts or columns 22, thereby to relieve the excessive pressure within the protected vessel or pipe system.

In order to prevent premature rupture of the disc 26, that is, rupture when the pressure within the protected vessel or pipe system is less than the predetermined release or bursting pressure, the rupture disc 26 is normally supported at its upper side, that is, at the side facing away from the pressure of the contained fluid, and such support is removed when the pressure within the protected vessel or pipe system reaches the predetermined release or bursting pressure to then permit rupture of the unsupported disc. In accordance with the present invention, a hydraulic system is provided for normally supporting the rupture disc 26 and this hydraulic system is automatically collapsed to withdraw the support from the rupture disc upon the occurrence of the predetermined release or bursting pressure within the protected vessel or pipe system.

In the rupture disc safety valve 10, the hydraulic support system for the rupture disc 26 includes a support follower 30 adapted to seat against the upper face of the rupture disc within the central opening of the mounting member 18 and to apply a downward force against the rupture disc resisting the upwardly acting force of the contained fluid under pressure. As seen in the drawing, the inner diameter of the outlet 12 is preferably smaller than the inner diameter of the mounting member 18 so that an upwardly facing annular shoulder is provided around the opening of the outlet 12 to support the load applied by the support follower when the pressure within the protected vessel or pipe system is low or when a vacuum exists in the latter. Further, the lower corner of the inner edge of mounting member 18 is either sharply angled or has a small radius to provide a shear edge promoting the rupture of the disc 26 therealong when the support load applied by the follower 30 is removed.

The follower 30 is formed with a central, hollow hub on the top side thereof defining a socket 32 for receiving the lower end of a support load spindle 34 which, at its upper end portion, is received in a hollow cylindrical guide 36 slidable in a central bearing 38 depending from the lower diaphragm chamber section 24.

The rupture disc safety valve 10 further includes an upper superstructure or body portion 40 having a downwardly flaring lower diaphragm chamber section 42 at its lower end. The diaphragm chamber sections 24 and 42 have radially outward directed flanges 44 and 46, respectively, extending along their edges and bolted, or otherwise secured, together to define a diaphragm chamber 48. A diaphragm 50 extends across the chamber 48 and is clamped, at its periphery, between the flanges 44 and 46. The diaphragm 50 may be formed of rubber and have a normal pouched configuration, as represented at 50' by the broken lines on Fig. 1, or a long stroke, deep convolution, constant area configuration, as represented at 50a in the embodiment of Fig. 5, hereinafter described in detail, or the rubber diaphragm may be replaced by a metallic bellows or corrugated diaphragm (not shown). A support load follower plate 52 extends across at least the central portion of the bottom of the diaphragm 50 and has the guide 36 depending therefrom so that, when a substantially incompressible hydraulic fluid is trapped within the portion 54 of the chamber 48 above the diaphragm 50, the hydraulic fluid will resist upward movement of the diaphragm 50, plate 52, guide 36, spindle 34, follower 30 and rupture disc 26, and thereby support the latter against the pressure of the fluid in the protected vessel or pipe system.

The collapse of the hydraulic support for the rupture disc 26 is effected by a safety relief valve which is generally identified by the reference numeral 56 and is incorporated in the upper superstructure 40. In order to accommodate the safety relief valve 56, the upper superstructure 40 includes a cylindrical portion 58 extending upwardly from the diaphragm chamber section 42 and having a radially inward directed flange 60 intermediate its ends to define a feather disc valve seat 62 on the upper surface of the flange 60 and a cylinder 64 extending downwardly from the flange 60 and opening into the upper portion 54 of the diaphragm chamber 48.

A feather disc 66 is adapted to seat downwardly upon the seat 62, as in conventional safety relief valves, and is urged in that direction by a helical compression spring 68 which is interposed between abutment discs 70 and 72 and extends around a spindle 74. The lower end of spindle 74 seats in an upwardly opening socket 76 at the center of the feather disc 66. The lower abutment disc 72 seats downwardly upon a spherical stop 78 on the spindle 74, while a hollow adjusting screw 80, in which the upper end of spindle 74 is loosely received, is threaded downwardly through a head 82 at the upper end of the superstructure 40 and has a spherical contacting surface at its lower end bearing downwardly upon the upper abutment disc 70. Thus, the seating force applied by the spring 68 against the feather disc 66, through the lower abutment 72 and spindle 74, can be varied by adjusting the screw 80 which determines the initial compression of the spring 68 between the discs 70 and 72. If desired, a removable cover 84 may be provided over the head of the adjusting screw 80 to avoid inadvertent turning of the latter.

In order to ensure that the safety relief valve 56 will have a very large "blow down," for example, a blow down of approximately 70% of the pop point of the feather disc, a departure is made from the usual wing guides for the feather disc, such wing guides being replaced, in the rupture disc safety valve 10, by a guide piston 86 reciprocable in the cylinder 64 and having a much larger effective area, preferably, five to six times greater, than the seating area of the feather disc 66. The feather disc has a depending extension 88 formed with a long tapered portion that is received in a correspondingly tapered central bore of the piston 86, to ensure the concentric location of the feather disc with the piston guide as well as to accurately locate the pocket 76 receiving the spring urged spindle 74. A stud projects from the lower end of the extension 88, and a nut 90 on that stud engages against the bottom face of the guide piston 86 to secure the latter to the feather disc 66.

The guide piston 86 has a pressure equalizing passage 92 extending axially therethrough and provided with a metering orifice 94 to control the rate of flow of hydraulic fluid between the portions of the cylinder 64 above and below the guide piston. The upper diaphragm chamber section 42 has a tapped opening 96 through which the hydraulic system may be charged, for example, by a charging arrangement illustrated schematically in Fig. 1 and including a reservoir 98 of hydraulic fluid, a pipe 100 leading from the reservoir to the tapped opening 96, and a pump 102, a pressure gauge 104, an admission valve 106 and a bleed-off valve 108 interposed, in series, in the pipe 100.

The above described rupture disc safety valve 10 operates as follows:

Before charging of the hydraulic support system, the support load diaphragm is in the normal position indicated at 50', so that no load is applied to the support follower 30 or the disc 26, and the feather disc 66 is seated by the force exerted by the spring 68. When the hydraulic system is charged with hydraulic fluid entering through the opening 96, the hydraulic fluid flows from the portion 54 of the diaphragm chamber 48 above the support load diaphragm 50 into the cylinder 64 below the guide piston 86 and then through the metering orifice 94 and pressure equalizing passage 92 into the portion of the cylinder 64 between the guide piston and the seated feather disc 66, thereby equalizing the pressures above and below the guide piston. The hydraulic fluid pumped into the hydraulic support system is under a sufficient pressure to urge the diaphragm 50 downwardly, for example, to the full line position of Fig. 1, so that the spindle 34 holds the support follower 30 downwardly against the rupture disc 26.

The bleed-off valve 108, which selectively communicates the charging opening 96 with either the pipe 10 or the atmosphere, may be manipulated to decrease the static pressure within the hydraulic support system, if the pressure of the fluid pumped through the pipe 100 is too high. Following charging of the hydraulic support system and adjustment of the static pressure therein, the admission valve 106 is closed to trap the hydraulic fluid in the system so that, thereafter, the only escape of hydraulic fluid from the closed system has to be achieved by unseating of the spring loaded feather disc 66.

Any upward movement of the rupture disc 26, resulting from the pressure of the fluid in the protected vessel or pipe system, and communicated to the diaphragm 50 by the support follower 30, spindle 34 and plate 52, will tend to reduce the volume of the space above the diaphragm occupied by the hydraulic fluid and, since the hydraulic fluid is substantially incompressible, will tend to lift or unseat the feather disc 66. However, since lifting of the feather disc is resisted by the spring 68, such upward movement of the rupture disc 26, and hence of the feather disc 66, will occur only when the force exerted against the rupture disc by the fluid in the protected vessel or pipe system is sufficient to overcome the resistance of the spring 68. It is apparent that the screw 84 can be adjusted so that the force exerted by the spring 68 will be sufficient to prevent unseating of the feather disc 66 until the pressure within the protected vessel or pipe system reaches the desired bursting pressure.

When the desired bursting pressure occurs in the protected vessel or pipe system, the rupture disc 26 is deflected upwardly and unseating of the feather disc 66 commences. As soon as the disc 66 is lifted from its seat 62, the hydraulic fluid above the piston 86 is immediately discharged past the seat 62 and through lateral openings under the head 82, so that the pressure above the piston 86 is reduced to atmospheric pressure, while the pressure below the guide piston is substantially undiminished, with the exception of the small pressure drop resulting from the metered flow of hydraulic fluid through the orifice 94 and the small additional leakage flow or blow-by of fluid between the relatively closely fitted piston and the wall surface of cylinder 64. Thus, a great pressure differential is created, acting over the relatively large effective area of the guide piston 86 to cause rapid lifting of the latter and of the feather disc 66. The rapid lift of the piston 86 almost instantaneously removes the hydraulic support previously given to the rupture disc 26 and, since the unsupported bursting pressure of the rupture disc is only about one-half the bursting pressure existing within the protected vessel or pipe system at the time of unseating of the feather disc 66, the unsupported disc 26 is instantaneously ruptured to relieve the pressure in the protected vessel or pipe system. When the metered flow of hydraulic fluid through the metering orifice 94 and the blow-by of fluid around the piston 86 have substantially reduced the differential between the pressures above and below the guide piston 86 so that the force of the spring 68 again predominates, the feather disc 66 is reseated.

It is apparent that, in the rupture disc safety valve 10 described above, the maintenance of close tolerances over the unsupported bursting pressure of the rupture disc 26 is of relatively little importance, as the bursting pressure of the assembly is determined by the setting of the spring force acting on the disc 66 of the safety relief valve 56. Since the "pop-point," that is, the pressure at which the feather disc 66 unseats, can be accurately regulated, it is possible to obtain closely reproducible bursting characteristics, as distinguished from existing devices wherein the structural failure of a rupture disc or frangible pin is counted upon to control the release. Further, by adjusting the screw 80, the "pop point" of the safety relief valve 56, and hence the bursting pressure, can be varied over a considerable range, which, in any case, is substantially greater than the unsupported bursting pressure of the rupture disc 26. The use of the guide piston 86 in association with the feather disc 66 also provides a stable arrangement during charging of the hydraulic system so that a close setting of the "pop point" can be effected without encountering false or premature unseating of the feather disc during charging. Since the rupture disc 26 is supported by the support follower 30 until the predetermined bursting pressure occurs in the protected vessel or pipe system to cause unseating of the feather disc 66 and collapse of the hydraulic support system, the necessity for forming the rupture disc of a material having a high ratio of yield point to ultimate strength is avoided, thereby greatly expanding the range of materials suitable for the rupture disc.

Although the above described action of the safety relief valve 56 in response to the occurrence of the bursting pressure in the protected vessel or pipe system instantly reduces the mechanical support given to the rupture disc to a very low order and, at the same time, discharges a considerable quantity of hydraulic fluid from the support system to permit high lift of the support follower 30 and of the ruptured disc away from the opening of the release outlet 12, and the inner surface 110 of the mounting member 18 preferably flares upwardly, as shown, to provide efficient discharge of the pressurized fluid from the outlet 12, the kinetic and static energy of the lading discharge, that is, of the fluid discharged from the protected vessel or pipe system, may be utilized to "kick" or rapidly move the support follower 30 up to full lift. Thus, as shown on Fig. 2, the support follower 30 may be provided with a lift disc 112 extending radially beyond the rupture disc contacting portion of the follower 30 and having a depending peripheral flange or rim 114 so that, when the disc 26 is ruptured and lifting of the follower 30 commences, the fluid escaping from the outlet 12 around the periphery of the follower 30 will impinge upwardly against the lift disc 112 to strongly urge the latter and the follower upwardly to the position of full lift. In order to ensure the desired action of the lift disc 112, the latter is preferably adjustable on the follower 30 for positioning of the rim 114 close to the flaring surface 110. Such adjustable mounting of the lift disc 112 on the follower 30 is achieved by providing the hub of the follower with external threads, as at 116, and the lift disc with an internally threaded hub 118 screwed on the threads 116 so that rotation of the lift disc causes its axial adjustment with respect to the follower 30. A set screw 120 extends through the hub 118 to secure the lift disc 112 in its adjusted position on the support follower 30.

In cases where a thin rupture disc 26, or a rupture disc of elastomeric material, is used and must be protected against rupture by a vacuum that may occur within the protected vessel or pipe system, the follower 30 is provided with an auxiliary plate 122 (Fig. 3) disposed disposed against the side of the rupture disc facing into the outlet 12 and held tightly against the rupture disc by a nut 124 threaded on a stud 126 extending downwardly from the follower 30.

Further, in certain cases where a thin elastomeric rupture disc is employed, a follower stop 128 (Fig. 4) is provided to limit the support load that can be transmitted to the rupture disc 26. As seen in Fig. 4, the follower stop 128 is generally cup-shaped and internally threaded, as at 130, to screw upwardly onto external threads 132 provided on the guide sleeve or bearing 38 depending from the lower diaphragm chamber section 24. At its center, the cup-shaped stop 128 has an integral, upwardly extending sleeve 134 telescoping into the bearing 38 and extending loosely around the spindle 34. The downward movement of the socket or guide 36, and hence the load applied to the rupture disc through the spindle 34 and follower 30, is limited by engagement of the lower end of guide 36 with the upper end of sleeve 134, while the latter may be axially adjusted by rotation of the stop 128 on the bearing 38. A set screw 136 extends radially through the stop 128 to engage the bearing 38 and thereby secure the stop in its adjusted position.

In Fig. 5, a rupture disc safety valve constructed in accordance with another embodiment of the present invention is illustrated and generally identified by the reference numeral 10a. The rupture disc safety valve 10a is generally similar to the valve 10 described in detail above, and the several parts of the valve 10a are identified by the same reference numerals employed in connection with the description of the corresponding parts of the valve 10, but with the letter "a" appended thereto.

The rupture disc safety valve 10a differs substantially from the first described embodiment of the invention only with respect to the path followed by the fluid discharged from the outlet 12a upon rupture of the disc 26a; the configuration of the support load diaphragm 50a; the location of the charging inlet 96a for the hydraulic fluid; and the provision of additional means in the guide piston 86a for reseating the feather disc 66a of the safety relief valve 56a after full collapse of the hydraulic support system has been achieved. Although other structural differences exist, they are of little or no functional importance and are obvious from the drawing, so that a detailed description of such differences is not required.

Considering the major differences in the order noted above, it will be seen that the lower body member 16a defines a chamber 138 above the mounting member 18a receiving the lading discharge when the disc 26a ruptures and the support follower 30a lifts. A conduit 140 extends from the chamber 138 to carry the lading discharge from the valve 10a. This is distinguished from the valve 10, wherein the lading discharge is freely exhausted between the posts 22 into the atmosphere. With the arrangement of valve 10a the conduit 140 may carry the lading discharge to another safety relief valve, similar to the valve 10a or of conventional construction, and connected in series with the valve 10a, if such an assembly is required by the operating conditions of the particular application.

It will be further seen that the diaphragm chamber 48a is cylindrical and accommodates a diaphragm 50a having a cylindrical side wall and a flat bottom wall connected to the side wall by a deep convolution so that a long stroke, constant effective area may be achieved. In the valve 10a the charging inlet 96a opens into the portion of the cylinder 64a disposed above the guide piston 86a so that, as hydraulic fluid is pumped through the charging inlet, the pressure of the hydraulic fluid acting downwardly upon the relatively large upper surface of the piston 86a tends to seat the feather disc 66a of the safety relief valve 56a. The hydraulic fluid admitted to the cylinder 64a above the guide piston flows through the passage 92a and metering orifice 94a of the latter to eventually fill the space between the diaphragm 50a and the guide piston. The operation of the safety relief valve 56a in collapsing the hydraulic support for the rupture disc 26a upon the occurrence of the bursting pressure is substantially the same as that described in connection with the valve 10. However, the guide piston 86a is provided with an additional passage 142 opening at the bottom and side, respectively, of the piston, and the cylinder 64a has an annular, radially inward opening groove 144 in the upper portion of its side wall. Normally, the end of the passage 142 opening at the side of piston 86a is closed by the adjacent side wall surface of the cylinder 64a. However, at the completion of the full lift of the feather disc 66a with the guide piston 86a achieving collapse of the hydraulic support for the rupture disc, the passage 142 opens into the groove 144 to provide additional communication between the spaces above and below the guide piston 86a, thereby to hasten the equalization of the pressures in such spaces and promote the reseating of the feather disc 66a.

Although several illustrative embodiments of the invention have been described in detail above and shown, by way of example, in the accompanying drawings, it is to be understood that the invention is not limited to such precise embodiments, and that various changes and modifications may be effected therein without departing from the scope or spirit of the invention as defined in the appended claims.

What is claimed is:

1. A rupture disc safety valve for releasing fluid under pressure from an outlet of a protected container when the pressure in the latter reaches a predetermined bursting pressure; said rupture disc safety valve comprising a rupturable disc adapted to extend across the outlet for normally sealing the latter and having a predetermined unsupported bursting pressure, hydraulic support means normally bolstering said rupturable disc so that the latter is able to withstand pressures from within the container exceeding said unsupported bursting pressure of the rupturable disc, and means effective to withdraw the bolstering effect of said hydraulic support means from said rupturable disc when the pressure within the protected container reaches said predetermined bursting pressure so that the disc then ruptures to permit the release of fluid through the outlet of the protected container.

2. A rupture disc safety valve for releasing fluid under pressure from an outlet of a protected container when the pressure in the latter reaches a predetermined bursting pressure; said rupture disc safety valve comprising a rupturable disc adapted to extend across the outlet for normally sealing the latter and having an unsupported bursting pressure lower than the predetermined bursting pressure at which release of fluid from the container is to be effected, hydraulic support means normally bolstering said rupturable disc so that the latter is able to withstand pressures from within the container exceeding said unsupported bursting pressure of the rupturable disc, and safety relief valve means interposed in said hydraulic support means and operative to collapse the latter and thereby withdraw the bolstering effect of said hydraulic support means from said disc when the pressure within the protected container reaches said predetermined bursting pressure so that the disc then ruptures to permit the release of fluid through the outlet of the protected container.

3. A rupture disc safety valve for releasing fluid under pressure from an outlet of a protected container when the pressure in the latter reaches a predetermined bursting pressure; said rupture disc safety valve comprising a rupturable disc adapted to extend across the outlet for normally sealing the latter and having an unsupported bursting pressure substantially lower than the predetermined bursting pressure at which release of fluid from the container is to be effected, a normally closed system containing hydraulic fluid and having a movable wall, support means extending from said movable wall to said rupturable disc so that the hydraulic fluid in said system is subjected to the pressure applied against said disc from within the protected container and supports the disc to resist the rupturing of said disc by pressures exceeding said unsupported bursting pressure so long as said system remains closed, and safety relief valve means in said system responding to the pressure within said system and operative to open when the pressure within the protected container reaches said predetermined bursting pressure thereby to permit the escape of hydraulic fluid from said system so that the support of said disc is withdrawn to permit the rupture of the latter by said predetermined bursting pressure and the release of fluid from the protected container through the outlet.

4. A rupture disc safety valve for releasing fluid under pressure from an outlet of a protected container when the pressure within the latter reaches a predetermined bursting pressure; said rupture disc safety valve comprising a rupturable disc extending across the container outlet for normally sealing the latter and having an unsupported bursting pressure substantially lower than the predetermined bursting pressure at which release of fluid through the outlet is to be effected, a normally closed hydraulic system having a chamber for hydraulic fluid defined, at least in part, by a movable wall, a support follower adapted to bear against said rupturable disc at the surface of the latter opposed to the surface exposed to the pressure of fluid in the protected container, follower means extending between said support follower and said movable wall so that, so long as said system remains closed, the hydraulic fluid therein resists movement of said follower means and support follower and the latter supports the rupturable disc to avoid rupture of the disc by pressures within the protected container exceeding said unsupported bursting pressure, and safety relief valve means interposed in said hydraulic system and operative to release hydraulic fluid from the latter when the pressure within the container exceeds the predetermined bursting pressure, thereby withdrawing the supporting action of said support follower from the disc and permitting rupture of the latter by said predetermined bursting pressure to release fluid through said outlet from the protected container.

5. A rupture disc safety valve for releasing fluid under pressure from an outlet of a protected container when the pressure within the latter reaches a predetermined bursting pressure; said rupture disc safety valve comprising a rupturable disc extending across the container outlet for normally sealing the latter and having an unsupported bursting pressure substantially lower than the predetermined bursting pressure at which release of fluid through the outlet is to be effected, a normally closed hydraulic system having a chamber for hydraulic fluid defined, at least in part, by a movable wall, a support follower adapted to bear against said rupturable disc at the surface of the latter opposed to the surface exposed to the pressure of fluid in the protected container, follower means extending between said support follower and said movable wall so that, so long as said system remains closed, the hydraulic fluid therein resists movement of said follower means and support follower and the latter supports the rupturable disc to avoid rupture of the disc by pressures within the protected container exceeding said unsupported bursting pressure, while the pressures acting against said disc from within the protected container are transmitted to the hydraulic fluid within said system, and safety relief valve means in said hydraulic system responding to the pressure of the hydraulic fluid in the latter and operative to open said system when the pressure within the protected container exceeds said predetermined bursting pressure thereby withdrawing the support from said disc and permitting rupture of the latter for release of fluid through the outlet from the protected container.

6. A rupture disc safety valve according to claim 5; wherein said movable wall is constituted by a flexible diaphragm extending across said chamber.

7. A rupture disc safety valve according to claim 5; wherein said chamber is defined by a flexible, cup-shaped member having a cylindrical side wall and a flat wall connected to the latter at one end by a deep convolution and constituting said movable wall so that the latter can be displaced through a stroke of substantial length without varying the effective area thereof subjected to the pressure of hydraulic fluid in said chamber.

8. A rupture disc safety valve according to claim 5; further comprising a lift disc adjustably mounted on said support follower and extending radially beyond the latter so that, when said rupturable disc is ruptured, fluid escaping under pressure from the protected container outlet impinges against said lift disc to effect movement of the latter and said support follower away from said outlet, thereby to rapidly decrease the obstruction imposed by said support follower to the release of fluid through the protected container outlet.

9. A rupture disc safety valve according to claim 5;

further comprising means limiting the movement of said support follower in the direction toward said rupturable disc, thereby to restrict the support load that may be applied to the latter by the pressure of hydraulic fluid in said system.

10. A rupture disc safety valve according to claim 5; further comprising a plate secured to said support follower and applied against the surface of said rupturable disc facing into the protected container outlet to prevent the failure of said rupturable disc into the outlet as a result of a vacuum occurring in the protected container.

11. A rupture disc safety valve for releasing fluid under pressure from an outlet of a protected container when the pressure in the latter reaches a predetermined bursting pressure; said rupture disc safety valve comprising a rupturable disc extended across the outlet for normally sealing the latter and having an unsupported bursting pressure substantially lower than the predetermined bursting pressure at which release of fluid from the protected container is to be effected, a normally closed system including a chamber for hydraulic fluid having a movable wall, a support for the rupturable disc applied against the side of the latter facing away from the sealed outlet, force transmission means between said support and said movable wall so that the hydraulic fluid in said chamber supports said disc against the pressure within the protected container so long as said system remains closed and the pressure applied to the disc is transmitted to the hydraulic fluid, a cylinder opening from said chamber and having a valve seat at the end remote from the chamber, a guide piston in said cylinder, means for establishing restricted communication between the interior spaces of said cylinder at the opposite sides of said guide piston, a feather disc valve connected to said guide piston and adapted to engage said valve seat for closing said system, said feather disc valve having a smaller area exposed to the pressure of fluid in said cylinder than the effective area of said guide piston, and spring means urging said feather disc valve against said seat so that, when the force exerted by the pressure of fluid in the protected container exceeds the force of said spring means, said feather disc valve is unseated to open said remote end of the cylinder and thereby create a large pressure differential at the opposite sides of said guide piston producing rapid movement of the latter away from said chamber to rapidly increase the effective volume of the latter and thereby to withdraw the support from said rupturable disc and permit the rupturing of the latter by the pressure within the protected container.

12. A rupture disc safety valve according to claim 11; further comprising means for adjusting the force exerted by said spring means upon said feather disc valve so that the latter can be arranged to unseat when the pressure in the protected container reaches the predetermined bursting pressure.

13. A rupture disc safety valve according to claim 12; further comprising means for admitting charging hydraulic fluid into said system at one side of said guide piston, and wherein said means for establishing restricted communication between the interior spaces of said cylinder at the opposite sides of said guide piston includes a passage extending axially through said guide piston and having a metering orifice therein so that a restricted flow of fluid can occur through said passage during charging to normally equalize the pressures at the opposite sides of the guide piston.

14. A rupture disc safety valve according to claim 13; wherein said guide piston further has a second passage, the opposite ends of which open at the cylindrical surface of the piston and at the side of the latter facing toward said chamber, respectively, and wherein said cylinder has an annular, radially inward opening groove in the inner surface thereof adjacent said remote end of the cylinder so that, when said feather disc valve is seated, the end of said second passage opening at the cylindrical surface of the piston is covered by said inner surface of the cylinder and, when said feather disc valve is lifted off its seat, said second passage communicates with said groove to permit pressure equalizing flow between the opposite sides of the piston and thereby to promote reseating of said feather disc valve.

15. A rupture disc safety valve according to claim 13; wherein said guide piston fits closely in said cylinder and has a central tapered bore therein, and said feather disc valve has an elongated, tapered extension received in said bore to connect the feather disc valve to the guide piston, so that the feather disc valve is accurately centered and guided in its seating and unseating movement by said piston.

16. A rupture disc safety valve according to claim 13; wherein said rupturable disc is held against the outlet by an annular mounting member having an inside edge surface flaring in the direction away from the outlet to ensure rapid opening of the latter as said support is withdrawn from the rupturable disc.

17. A rupture disc safety valve according to claim 16; further comprising a discharge accumulation chamber extending from said mounting member, and an exhaust conduit opening from said discharge accumulation chamber for carrying away the fluid released from the protected chamber.

References Cited in the file of this patent
UNITED STATES PATENTS

| | | |
|---|---|---|
| 372,493 | Shaw | Nov. 1, 1887 |
| 1,779,056 | Till | Oct. 21, 1930 |
| 2,261,364 | Grove | Nov. 4, 1941 |
| 2,556,867 | Carlisle | June 12, 1951 |
| 2,721,576 | Grove | Oct. 25, 1955 |